Oct. 19, 1965     R. R. CIRCLE     3,213,323

BREAKER TRIPPING SIGNAL CIRCUIT

Filed Oct. 16, 1962

WITNESSES
John L. Chopp
James F. Young

INVENTOR
Robert R. Circle
BY Maury I. Hull
ATTORNEY

United States Patent Office 3,213,323
Patented Oct. 19, 1965

3,213,323
BREAKER TRIPPING SIGNAL CIRCUIT
Robert R. Circle, Elizabeth Township, Allegheny County, Pa., assignor to Westinghouse Electric Corporation, Pittsburgh, Pa., a corporation of Pennsylvania
Filed Oct. 16, 1962, Ser. No. 230,973
7 Claims. (Cl. 317—33)

This invention relates to improvements in circuits for controlling the operation of circuit breakers, and more particularly to an improved fast-acting circuit for generating a signal proportional to the rate of change of line current and utilizing the signal for opening the contacts of the circuit breaker as soon as possible after a fault occurs in the line.

In prior art circuits, a current transformer is used to sense the fault current in the line and provide a signal for closing a relay which allows current to flow through a trip coil, causing the breaker to open.

This system has the disadvantage that the fault is not sensed until the short circuit current has built up to fault level, which may be ¼ cycle after the fault occurs. After the current transformer senses that a fault exists on the line a relay is closed, which may require another ¼ cycle, to initiate the opening of the breaker. Thus about ½ cycle of time has elapsed from the time the fault occurred before the breaker even begins to open.

In summary, the apparatus of the instant invention overcomes these and other disadvantages of the prior art by employing means connected in the line to be protected which will produce a signal when a high rate-of-rise of current occurs in the line. This signal is then used to operate the trip coil of the circuit breaker, thus initiating interruption without delay the moment a fault in the line actually occurs.

Accordingly, a primary object of the instant invention is to provide a new and improved breaker tripping signal circuit.

Another object is to provide a new and improved breaker tripping signal circuit utilizing a high rate-of-rise of current in the line to be protected for tripping the breaker contacts.

These and other objects and advantages will become more fully apparent after a study of the following specification, when read in connection with the accompanying drawings, in which.

Figure 1:
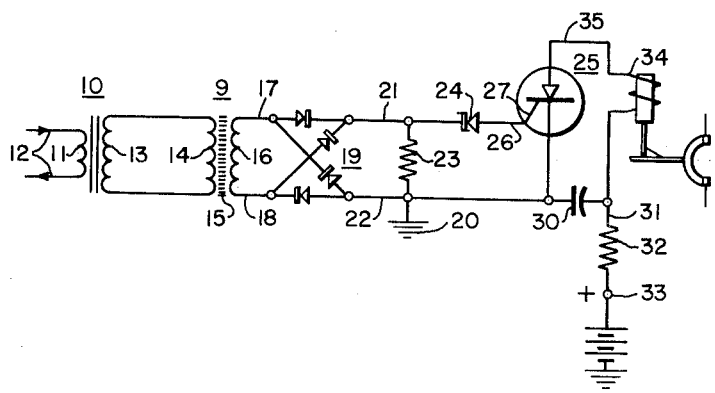
FIG. 1 is a schematic circuit diagram of apparatus embodying the invention.

In the drawing of FIG. 1, a current transformer generally designated 10, and which may be of any suitable type, has a primary winding 11 connected in series in the line 12 to be protected, the secondary winding 13 of the current transformer 10 having the output leads thereof connected to the primary winding 14 of a pulse generating transformer 9 of the saturable core type having a saturable core 15 and a secondary winding 16. The core 15 may be of a material having a "square loop" B–H characteristic curve. The output of the secondary 16 is supplied by way of leads 17 and 18 to a full wave rectifier generally designated 19 and including four rectifiers connected as shown, with the polarities chosen to provide a direct current signal of selected polarity on leads 21 and 22. Leads 21 and 22 have the resistor 23 connected therebetween, across which a voltage drop is developed which varies in amplitude in accordance with variations in the current from the rectifier 19, the voltage drop across resistor 23 being of a polarity to apply a reverse potential to the Zener diode 24, and being applied to the Zener diode 24 by way of lead 22, controlled rectifier 25 and lead 26. The controlled rectifier may be of a type known in the trade as a "Trinistor." When the potential across the Zener diode 24 reaches the breakdwn point, the diode breaks down and becomes conductive applying a signal to the control electrode 27 of the aforementioned controlled rectifier 25 rendering the controlled rectifier conductive.

Also connected to the aforementioned lead 22 and ground 20 is one terminal of a capacitor 30 having the other terminal thereof connected by way of lead 31 and resistor 32 to the positive terminal 33 of a suitable source of direct current energizing potential having the other negative terminal thereof connected to ground 40. While the controlled rectifier 25 is nonconductive, current from the direct current source of potential connected to 33 charges the capacitor 30 through the resistor 32. When the controlled rectifier 25 becomes conductive, it completes a circuit from the capacitor 30 through the tripping coil 34 of the circuit breaker by way of lead 31, coil 34 and lead 25. A surge of current from the capacitor 30 causes the fast build-up of flux in the tripping coil 34 and fast release of the contacts of the circuit breaker, opening the circuit rapidly after the controlled rectifier 25 is rendered conductive.

Figure 2:
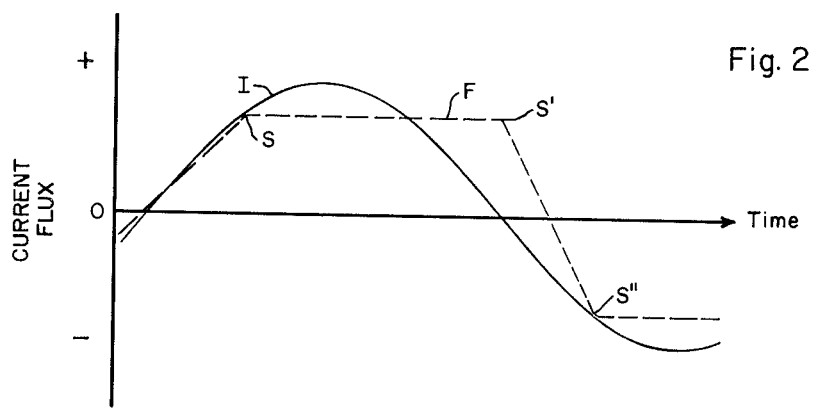
FIG. 2 is a graph illustrating the operation of the apparatus of FIG. 1.

As previously stated, one of the objectives of the invention is to provide a circuit breaker having a trip coil which would be immediately energized when a rapid increase in current in the line, such as would result from a fault, occurred, without waiting for the fault current or short circuit current in the line to reach its peak; in other words, to trigger the trip coil when the current started to rise in a fashion indicative of the fact that a fault had occurred. Particular reference is made now to FIG. 2, showing in simplified or idealized curves one possible flux and current relationship in the pulse transformer 9. It should be clearly understood that FIG. 2 is illustrative of one possible relationship of several, all of which will be readily visualized by those skilled in the art. In FIG. 2, the curve I represents the current in the primary 14 and curve F represents the flux in the core 15. It will be seen that the flux follows the current until a point S is reached at which time the core material is saturated, and the flux curve levels off in amplitude, remaining at substantially that amplitude until the current passes through zero, whereupon the flux curve decreases toward zero and flux of opposite polarity starts to build up in the core. As will be readily understood, the change in flux in that portion of the flux curve between the points S' and S" induces a voltage in the secondary 16, and the voltage induced in the secondary is proportional to the rate of change of the flux. If for example the amplitude of current curve I were to double, it can readily be seen that the slope of the flux curve F between points S' and S" would become steeper or more nearly vertical, indicating a greater rate of change of flux in the secondary. Accordingly, the amplitude of the pulse signals in the secondary 16 varies with variations in the rate-of-rise of the current in primary 14.

During those portions of the cycle of the alternating current in transformer 9 when the core 15 is not saturated, the voltage across leads 17 and 18 is approximately proportional to the current in the primary.

It will be understood that transient effects in the secondary circuit resulting from sudden increases in primary current may in some cases be relied upon to provide the pulse which breaks down the Zener diode.

The value of resistor 23 is preferably made variable to permit adjustment of the rate of change of primary current at which the voltage across the aforementioned Zener diode 24 reaches the breakdown point.

There has been provided then, apparatus well suited to accomplish the aforedescribed objects of the invention. A rapid rise of current in the line 12 results in a rapid rise in current in primary 14 causing the prompt break down of the Zener diode 24 and triggering of the controlled rectifier 25 to permit the discharge of the previously charged capacitor 30 through the tripping coil 34, so that the tripping coil is operated in response to a first initial rapid change in current in the line such as would result from a fault or short circuit, without waiting for the fault current to reach some critical or maximum value.

Any suitable reset circuit may be provided, if needed, for the controlled rectifier.

Since numerous changes may be made in the above-described construction, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A control circuit for a circuit breaker having a tripping coil comprising, in combination, saturable core transformer means adapted to be operatively connected to an alternating current line to be protected, full wave rectifier means for obtaining a signal of uniform polarity which varies in amplitude in accordance with variations in the rate of change of current in the line during an alternation of either polarity of the current therein, and circuit means including energizing means and a controlled rectifier gated by the signal connecting the tripping coil to the signal obtaining means for energizing the coil when the signal attains at least a predetermined amplitude.

2. A circuit breaker control circuit comprising, in combination, means including a saturable core transformer operatively connected to an alternating current line to be protected for obtaining a signal which varies in amplitude in accordance with variations in the rate of increase of current in said line during an alternation of either polarity of the alternating current therein, a tripping coil for the circuit breaker, and circuit means including energizing means and a controlled rectifier gated by the signal connecting the tripping coil to the signal obtaining means for applying an energizing potential to the tripping coil when said signal attains at least a predetermined amplitude whereby the circuit breaker opens the line when the current in said line rises at at least a predetermined rate.

3. In combination, first transformer means connected to an alternating current transmission line to be protected, saturable core transformer means connected to the first transformer means to be energized by the output thereof, full wave rectifier means energized from the saturable core transformer means for obtaining a signal which varies in amplitude in accordance with variations in the rate of increase of current in said line during an alternation of either polarity of the alternating current therein, a circuit breaker including a tripping coil, said circuit breaker having contacts connected in series in the line and adapted upon the energization of the tripping coil to open the line, and circuit means including a source of energizing potential connecting the tripping coil to the signal obtaining means, the circuit means including a controlled rectifier gated by the signal for energizing the tripping coil when the signal reaches a predetermined amplitude whereby the circuit breaker contacts are opened when the current in the line rises at at least a predetermined rate.

4. A control circuit for use with a circuit breaker having the contacts thereof in an alternating current line to be protected and having a tripping coil adapted when energized to open the contacts, comprising, in combination, pulse obtaining means including a saturable core transformer operatively connected to the line and a full wave rectifier for obtaining pulses of uniform polarity which vary in amplitude in accordace with variations in the rate of increase of current in the line during an alternation of either polarity of the alternating current therein, a source of coil energizing potential, and circuit means including a controlled rectifier having an anode, cathode and control element interconnecting the source of potential, the coil and the pulse obtaining means, the circuit means providing that pulses of at least a predetermined amplitude are impressed between the control element and the cathode, the coil and source being connected in series between the anode and cathode whereby said pulses of at least a predetermined amplitude cause the controlled rectifier to become conductive and apply energy from the source of potential to the tripping coil.

5. A control circuit for use with a breaker having contacts in an alternating current line to be protected and a tripping coil for opening said contacts when the coil is energized comprising, in combination, means including a saturable core transformer operatively connected to the line and a full wave rectifier energized therefrom for obtaining pulses of uniform polarity which vary in amplitude in accordance with variations in the rate of change of current in said line during an alternation of either polarity of the alternating current therein, circuit means including a Zener diode operatively connected to the pulse obtaining means, said Zener diode being rendered conductive by said pulses when the rate of change of current in the line attains at least a predetermined value, and other circuit means including a resistor, a source of energizing potential and a controlled rectifier having an anode, cathode and a control element interconnecting the Zener diode and the tripping coil, said resistor being connected across said full wave rectifier and providing a load therefor, said resistor and said Zener diode being connected in series between said cathode and said control element, said source and said coil being connected in series between said cathode and said anode whereby the controlled rectifier is rendered conductive when the Zener diode becomes conductive, the controlled rectifier when rendered conductive applying the energizing potential to the tripping coil.

6. A control circuit for use with a circuit breaker having contacts in an alternating current line to be protected and having a tripping coil adapted when energized to open the contacts comprising, in combination, a current transformer having a primary and a secondary and having the primary connected in series in said line, pulse transformer means including full wave rectifier means connected to said secondary to be energized therefrom, said pulse transformer means being constructed and arranged to provide pulses having amplitudes which vary in accordance with variations in the rate of change of current in the line during an alternation of either polarity of the alternating current therein, a controlled rectifier having an anode, a cathode and a control element, Zener diode means connecting the control element of the controlled rectifier to the rectifier means whereby pulses of at least a predetermined amplitude cause the controlled rectifier to become conductive, a source of energizing potential for the tripping coil, the source of energizing potential including a charged capacitor adapted to provide a surge of current when the circuit thereacross is closed, and circuit means connecting the anode and cathode of the controlled rectifier in series with said coil and source of energizing potential whereby the coil is energized when the controlled rectifier becomes conductive and accordingly when the rate of change of current in the line attains at least a predetermined value.

7. A control circuit for use with a circuit breaker having contacts in an alternating current line to be protected and having a tripping coil adapted when energized to open the contacts comprising, in combination, means including a saturable core transformer operatively connected to the line for obtaining a signal which varies in amplitude in accordance with variations in the rate of change of current in the line during an alternation of either polarity of the alternating current therein, means connected to said signal obtaining means for obtaining a voltage of uniform polarity proportional to the amplitude of the signal, Zener diode means, a controlled rectifier having an anode, cathode and a control element, series circuit means including the control element-cathode path through the controlled rectifier connecting the voltage obtaining means in series with the Zener diode means for applying a voltage across the Zener diode means of a polarity to break down the Zener diode means and cause the passage of current therethrough when the last named voltage attains at least a predetermined amplitude whereby the current passed by the Zener diode means is applied to the control element of the controlled rectifier to cause the controlled rectifier to become conductive, other series circuit means including capacitor means connecting the anode-cathode path through the controlled rectifier in series with the tripping coil, and means for charging the capacitor means while the controlled rectifier is non-conductive, whereby the tripping coil is quickly energized by a surge of current from the capacitor means when the controlled rectifier is rendered conductive.

References Cited by the Examiner

UNITED STATES PATENTS

| | | | |
|---|---|---|---|
| 2,509,027 | 5/50 | Zimmerman | 317—51 |
| 3,110,856 | 11/63 | Albert | 317—33 |

OTHER REFERENCES

"Controlled Rectifier Manual," First Edition, General Electric Company, March 21, 1960, pages 47–48.

SAMUEL BERNSTEIN, *Primary Examiner.*